Oct. 10, 1939. G. SLAYTER 2,175,224
ELECTRICALLY HEATED BLOWER
Original Filed Oct. 4, 1934 2 Sheets-Sheet 2
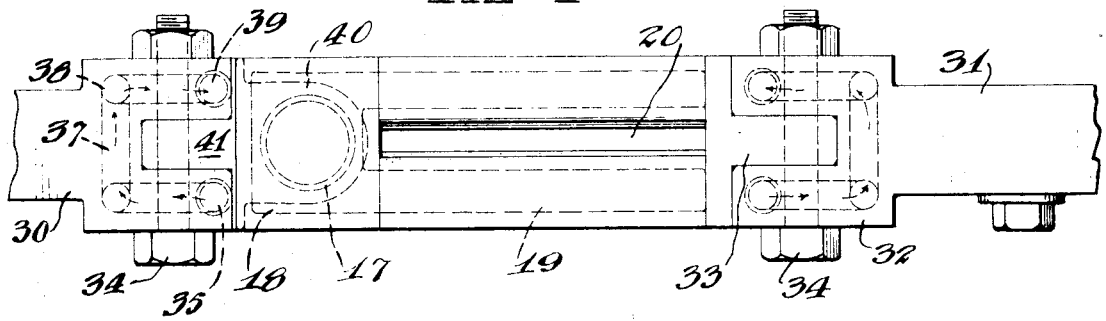
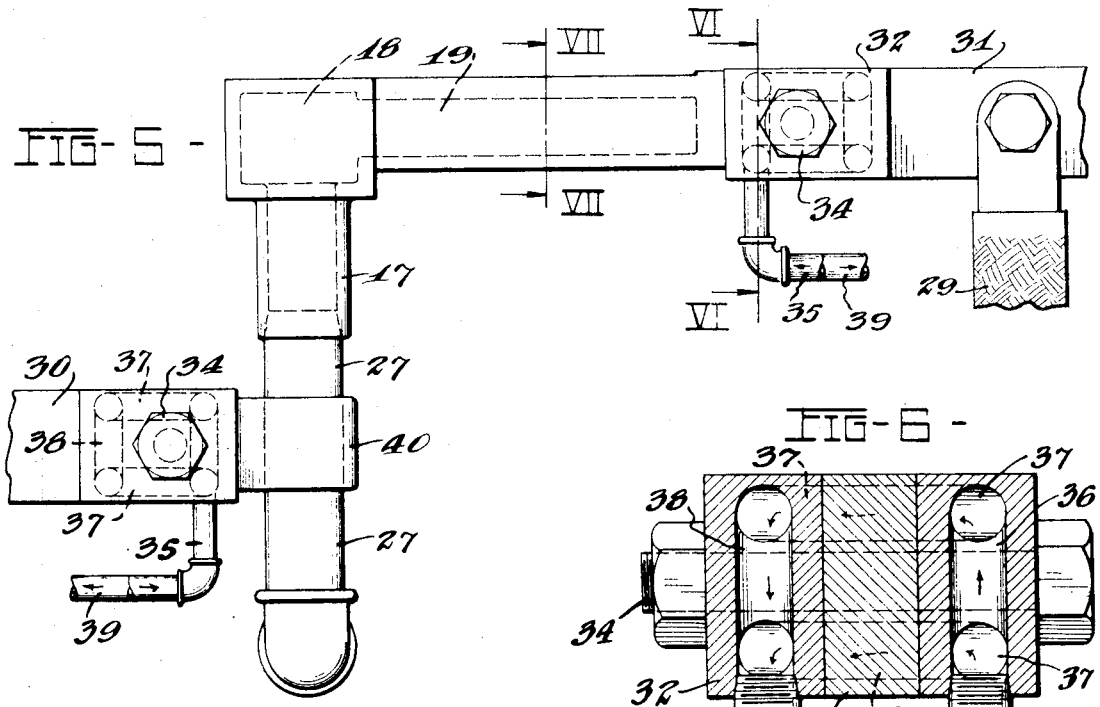
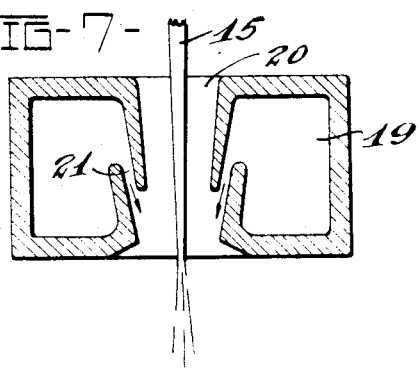
Garner Slayter
INVENTOR.
BY J. F. Rule
ATTORNEY.

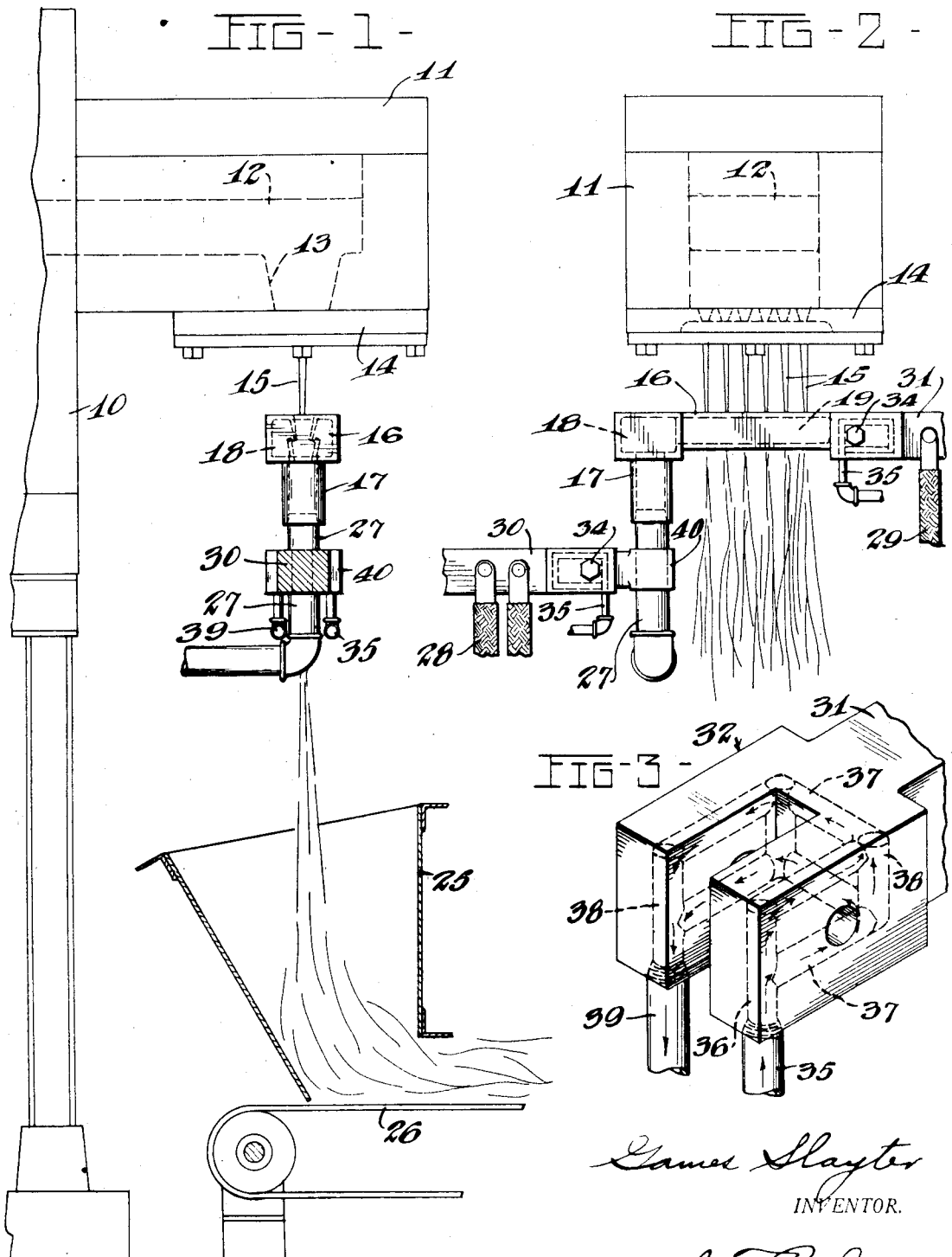

Patented Oct. 10, 1939

2,175,224

UNITED STATES PATENT OFFICE 2,175,224

ELECTRICALLY HEATED BLOWER

Games Slayter, Newark, Ohio, assignor, by mesne assignments, to Owens-Corning Fiberglas Corporation, a corporation of Delaware Application October 4, 1934, Serial No. 746,879
Renewed December 19, 1938

10 Claims. (Cl. 83—91)

My invention relates to means for electrically heating steam or other gas which is supplied under pressure to a blower, and thereby raising the temperature of the gas to a high degree. The invention is of special utility when used in connection with a blower for reducing a stream or streams of molten glass to fine threads or filaments.

A method in use at the present time for making fibrous glass, certain forms of which are known in the trade as "glass wool", consists in passing a stream or streams of molten glass through a blower which applies a blast of gas to the flowing glass in a manner to draw it out into fine threads or filaments. The fibers as they are formed are immediately cooled and solidified by the enveloping gas and accumulate as they are formed in a loose mass resembling wool. As the steam or other gas is at a temperature far below that at which the glass solidifies, it rapidly cools and congeals the glass while the latter is still within the drawing influence of the gas.

I have found that by raising the temperature of the blowing steam or gas to a high degree, so as to diminish and retard the cooling effect on the glass, the latter may be drawn to much finer threads or filaments than is possible without such heating of the gas. In practice, steam is ordinarily employed with blowers used for the purpose above indicated.

An object of my invention is to provide means for raising to a high temperature, the steam or other gas used with such blower, thereby enabling a stream of glass or the like to be blown to fine fibers. More particularly, the invention provides means for electrically heating a blower and the pipe or conduit leading thereto, so that the steam in its passage to and through the blower is superheated to a very high degree.

Other objects of the invention will appear hereinafter.

Referring to the accompanying drawings:

Fig. 1 is a side elevation, partly in section, of an apparatus embodying the present invention.

Fig. 2 is a fragmentary front elevation of the same.

Fig. 3 is a perspective view showing means for water cooling one of the electrical conductors at its junction with the blower.

Fig. 4 is a top plan view of the blower and the electrical conductors connected thereto.

Fig. 5 is an elevation of the same.

Figs. 6 and 7 are sectional views at the lines VI—VI and VII—VII, respectively, on Fig. 5.

Referring particularly to Figs. 1 and 2, a glass melting and refining tank or furnace 10 is provided with a forehearth extension 11 to which molten glass is continuously supplied, the level of the glass being indicated at 12. The glass passes downward through a well 13 in the floor of the forehearth and through a series of openings in a bushing 14 beneath the well. The glass issues from said openings in a series of streams 15 which flow vertically downward to and through a blower 16.

The blower, as herein shown, is provided with an intake pipe or tube 17 at one end thereof, opening into a pressure chamber or compartment 18. Branch conduits or pressure chambers 19 extend from the chamber 18 lengthwise of the blower on opposite sides of the center line. The blower is provided with an opening or passageway 20 in the form of a slot extending lengthwise of the blower between the chambers 19. The inner walls of the chambers 19 (see Fig. 7) are formed with narrow slots or openings 21 extending therethrough in a downwardly and inwardly inclined direction. These serve to direct jets or sheets of the steam in a downwardly convergent direction so that they impinge on the streams of glass 15 flowing through the slot 20. The force of the steam blast draws and attenuates the streams of glass into the form of filaments which quickly cool and solidify. These filaments are carried downward through a funnel guide or chute 25 (Fig. 1) and accumulate in a loose mass on a traveling belt conveyor 26. The fibrous glass or wool thus produced is carried by the conveyor 26 to other mechanism (not shown) for further treatment.

As shown in Fig. 7, the walls of the slots or openings 21 on opposite sides of the passageway 20, have an angle of convergence of about 24°. Thus each issuing jet or blast of gas is directed at an angle of about 12° to the vertical axes of the flowing streams. The streams enter the vortex of the meeting blasts of gas and are thus subjected to the downward drawing action or pull of the blast.

I have found that the angle at which the blast of steam or gas is directed against the stream or streams of glass is important and that successful operation can only be obtained by keeping this angle within narrow limits. If the angle is materially increased beyond that herein shown and described, the meeting blasts of gas produce cross-currents and a turbulence which interferes with the continuous steady pull on the glass which is necessary for satisfactory operation. Also, the effective pull on the glass is greatly reduced by more than a slight increase in the angle above that specified. Too wide an angle also interferes with the downward suction of air which is drawn into the blower from the upper side thereof and, moreover, causes a back draft and an upward discharge of glass after the latter passes through the blower. Portions of the glass are thus carried back to the feeder outlets and foul the latter, interfering with successful operation.

If an angle of convergence of the steam jets is materially reduced below that herein shown, it prevents the steam from effectively gripping and pulling the glass so that the drawing action on the glass is insufficient for satisfactory operation.

In order to superheat the steam to any desired high temperature, I provide means for passing an electric current through the blower 16 and a pipe 27 which is connected to the intake 17 for conveying steam or gas to the blower. The electric current is conducted through cables 28 and 29 connected to bus bars 30 and 31, respectively. The bus bar 31 has a forked end 32 to embrace a connecting lug 33 formed on the end of the blower, the parts being clamped together by a bolt 34.

In order to prevent undue heating at the connection 32, 33, I provide cooling means comprising an intake pipe 35 opening into a vertical passageway 36. The water or other cooling medium entering the passageway 36 is directed through a system of horizontal channels 37 and vertical channels 38 to an outlet pipe 39. The direction of flow is indicated by the arrows (Figs. 3, 4 and 6). The bus bar 30 is connected to a collar 40 on the pipe 27, said collar having a lug 41 for attachment to the bus bar 30, the construction being the same as above described in connection with the bus bar 31. Cooling means like that above described is also provided for the joint between the bus bar 30 and collar 40.

When an electric current is passed through the blower and the lead-in pipe 27, they are heated thereby to any desired degree, depending upon the volume of current and the electrical resistance. When the desired temperatures are not in excess of 1200° F., the blower and lead-in pipe may be made of nichrome steel, which I have found gives very satisfactory results. Where temperatures above 1200° F. are desired, a precious metal alloy, as for example, a platinum-rhodium alloy, may be used which will enable the temperature to approach or exceed 2500° F. By heating the blower and the lead-in pipe to the high temperatures indicated, the steam entering and passing through the blower is heated to a correspondingly high degree. This high temperature may approach or exceed the temperatures of the streams of glass entering the blower, so that the steam can operate effectively to draw the glass into filaments of great fineness before the glass is chilled and hardened to a degree to interfere with the stretching or attenuating action of the steam thereon. Although steam is particularly referred to, and at present is considered the preferred form of gas for the purpose indicated, it will be understood that air or other gases may be employed.

Modifications of the construction and method of practicing my invention may be resorted to without departing from the spirit and scope of the invention as defined in the appended claims.

I claim:

1. The combination of a blower comprising a horizontally disposed pressure chamber formed with a slot extending lengthwise of said chamber in a side wall thereof and providing an elongated opening through said wall, means for supplying gas under pressure to said chamber and causing it to issue through said slot, means for electrically heating the chamber walls and thereby heating the issuing gas to a high temperature, and a container for molten glass provided with a row of bottom outlet openings positioned above the blower and parallel with said slot, through which outlet openings streams of molten glass flow downward past said slot within the path of the issuing gas, whereby the streams of glass are drawn out by the force of the gas into fine filaments.

2. The combination of a blower comprising a pressure chamber, parallel branch chambers extending horizontally from said pressure chamber and spaced to provide a narrow, horizontally disposed passageway therebetween, the walls of the branch chambers along said passageway being formed with outlet openings, means for supplying gas under pressure to said chambers and causing it to issue from said outlet openings, the latter being shaped and arranged to direct the gas in downwardly convergent directions from said walls, and means for electrically heating the walls of said chambers and thereby heating the gas to a high temperature.

3. The combination of a blower comprising a pressure chamber, parallel branch chambers extending horizontally from said pressure chamber and spaced to provide a narrow, horizontally disposed passageway therebetween, the walls of the branch chambers along said passageway being formed with outlet openings, means for supplying gas under pressure to said chambers and causing it to issue from said outlet openings, the latter being shaped and arranged to direct the gas in downwardly convergent directions from said walls, means for electrically heating the walls of said chambers and thereby heating the gas to a high temperature, said heating means including bus bars connected to the blower, and means for water cooling the bus bars at their points of connection with the blower.

4. The combination of a blower comprising a pressure chamber, parallel branch chambers extending horizontally from said pressure chamber and spaced to provide a narrow, horizontally disposed passageway therebetween, the walls of the branch chambers along said passageway being formed with outlet openings, means for supplying gas under pressure to said chambers and causing it to issue from said outlet openings, the latter being shaped and arranged to direct the gas in downwardly convergent directions from said walls, means for electrically heating the walls of said chambers and thereby heating the gas to a high temperature, and a container for molten glass provided with a row of bottom outlet openings through which the glass issues in a row of streams, said row of bottom openings being directly above and parallel with said passageway, whereby the streams of glass are directed through said passageway and drawn by the force of the gas to attenuated filaments.

5. The combination of a blower comprising a horizontally disposed pressure chamber, means for supplying gas under pressure to said chamber, outlet means extending lengthwise of said chamber in a side wall thereof through which the gas is caused to issue from said chamber, means for electrically heating the chamber walls and thereby heating the issuing gas to a high temperature, and a container for a supply body of molten glass provided with a row of outlet openings positioned above the blower and parallel with said outlet means, through which outlet openings streams of molten glass flow downward from said molten supply body past said outlet means within the path of the issuing gas, whereby the streams of glass are drawn out by the force of the gas into fine filaments.

6. The combination of a blower comprising a horizontally disposed pressure chamber, means for supplying gas under pressure to said chamber, outlet means extending lengthwise of said chamber in a side wall thereof through which the gas is caused to issue from said chamber, means for electrically heating the chamber walls and thereby heating the issuing gas to a high temperature, and a container for a supply body of molten glass provided with a row of outlet openings positioned above the blower and parallel with said outlet means, through which outlet openings streams of molten glass flow downward from said molten supply body past said outlet means within the path of the issuing gas, whereby the streams of glass are drawn out by the force of the gas into fine filaments, said outlet means being arranged to direct the issuing gas at an angle of about 12° to the direction of said streams of glass.

7. The combination of a blower comprising a pressure chamber, parallel branch chambers extending horizontally from said pressure chamber and spaced to provide a narrow, horizontally disposed passageway therebetween, the walls of the branch chambers along said passageway being formed with outlet openings, means for supplying gas under pressure to said chambers and causing it to issue from said outlet openings, the latter being shaped and arranged to direct the gas in downwardly convergent directions from said walls, the angle of convergence being about 24 degrees, and means for electrically heating the walls of said chambers and thereby heating the gas to a high temperature.

8. The combination of a blower comprising a pressure chamber, parallel branch chambers extending horizontally from said pressure chamber and spaced to provide a narrow, horizontally disposed passageway therebetween, said passageway being of substantially equal width throughout its length, the walls of the branch chambers along said passageway being formed with outlet openings, and means for supplying gas under pressure to said chambers and causing it to issue from said outlet openings, the latter being shaped and arranged to direct the gas in downwardly convergent directions from said walls, the angle of convergence being about 24 degrees.

9. The combination with means for flowing a substantially straight row of closely and uniformly spaced streams of molten or viscous glass from a supply body of molten glass, of blowers associated therewith and positioned on opposite sides of and adjacent the path of said streams, said blowers each having outlet means parallel with said row of streams, each blower being constructed to direct a blast of gas in a downwardly inclined direction toward said streams with the blast distributed in flat sheet formation along said row of streams and with the direction of the blast inclined to the direction of stream flow at an angle of approximately 12 degrees, whereby the gas is caused to impinge upon the streams of glass and attenuate them to the form of fine filaments.

10. The combination with a container for a pool of molten glass and means for flowing a row of streams of molten or viscous glass from said pool, of blowing means comprising pressure chambers spaced to provide a straight narrow passageway therebetween, said passageway being of substantially equal width throughout its length, and extending lengthwise of said row of streams with the walls of said passageway located on opposite sides of the path of said streams, said walls being formed with outlet means through which gas under pressure is discharged and by which the issuing gas is directed in downwardly convergent paths which meet at the axes of said streams, with said convergent paths of the gas each at an angle to the streams of glass of approximately 12 degrees.

GAMES SLAYTER.